United States Patent [19]

Haigh

[11] 4,058,192

[45] Nov. 15, 1977

[54] UNI-DIRECTIONAL MECHANISM

[75] Inventor: Robert Haigh, Northboro, Mass.

[73] Assignee: Lowell Corporation, Worcester, Mass.

[21] Appl. No.: 688,690

[22] Filed: May 21, 1976

[51] Int. Cl.² .............................................. F16D 41/18
[52] U.S. Cl. ........................................ 192/46; 74/578
[58] Field of Search ............. 192/46; 188/82.7, 82.77, 188/82.8; 74/578, 15.6; 81/60, 61

[56] References Cited

U.S. PATENT DOCUMENTS

| 838,099 | 12/1906 | Garland | 81/60 |
|---|---|---|---|
| 1,075,311 | 10/1913 | Beck | 74/578 X |
| 1,827,202 | 10/1931 | Klein | 81/61 |
| 1,883,966 | 10/1932 | Krause | 192/46 X |
| 3,233,471 | 2/1966 | Benson et al. | 192/46 X |

FOREIGN PATENT DOCUMENTS 247,927  6/1912  Germany ........................ 188/82.8

*Primary Examiner*—Irwin C. Cohen
*Attorney, Agent, or Firm*—Norman S. Blodgett; Gerry A. Blodgett

[57] ABSTRACT

A uni-directional mechanism having an input element and an output element arranged to be coupled for power transmission from the input element to the output element when the input element is rotated in one direction, but not when it is rotated in the other direction.

4 Claims, 4 Drawing Figures

UNI-DIRECTIONAL MECHANISM

BACKGROUND OF THE INVENTION

In the connecting of a driving device, such as a motor, to a driven device, such as a piece of machinery, two procedures have been commonly used for producing such a coupling in a way that the driven member is driven only when the driving member is rotated in a given direction. One of these procedures is by the use of a ratchet, wherein a pawl hinged to the driving element engages steep surfaces of teeth on the driven element when the driving element is rotated in one direction and slide up sloping surfaces of the teeth when the driving element is rotated in the other direction. The other procedure is by use of a clutch in which the active element is a sprag which frictionally engages the driving and the driven elements by jamming when the driven element is driven in one direction, but which simply slides over the surfaces when the driven element is rotated in the other direction. Both of these procedures have inherent limitations. The ratchet is capable of exerting large driving forces or torque between the driven and the driving element, but it has a rather large increment of movement before it picks up the load, i.e., before the pawl engages a tooth. This increment may be as large a tooth distance. When one attempts to reduce this increment by making the teeth finer, the cross-sectional area of tooth available to transmit the torque (shear strength) is reduced. Furthermore, the hinge pin, spring, and sharp point associated with the pawl lead to wear and breakage. The spragtype coupling, on the other hand, has only a small increment of movement before it picks up the load, and in this respect, it is like a ratchet with an infinitely fine tooth; however, it transmits the power by friction and, therefore, the amount of power or torque that can be transmitted is limited by the friction that can be developed between surface of the sprag and the engaging surfaces of the input and output elements of the coupling. Another deficiency of the sprag coupling is the extreme wear that takes place when it is used for carrying starting and stopping loads. The sprag and the elements which it engages are formed of a hard material and considerable wear can take place. These and other difficulties experienced with the prior art uni-directional mechanisms have been obviated in a novel manner by the present invention.

It is, therefore, an outstanding object of this invention to provide the uni-directional mechanism capable of transmitting large torque without an increment of non-power transmitting motion before load is picked up.

Another object of this invention is the provision of a uni-directional mechanism capable of connecting a driving device to a driven device which is capable of transmitting large torques with a minimum of wear to the operating parts.

A further object of the present invention is the provision of a uni-directional mechanism having the advantages of a ratchet clutch and a sprag clutch, but none of their disadvantages.

It is another object of the instant invention to provide a uni-directional mechanism wherein the transmittal of power takes place almost immediately at the start of motion at the driving device, which device is simple in construction.

It is another object of the instant invention to provide a uni-directional mechanism which can be inexpensively manufactured by conventional manufacturing methods and which is capable of a long life of useful service with a minimum of maintenance.

SUMMARY OF THE INVENTION

In general, the invention consists of a uni-directional mechanism having a housing, having a rotatable wheel mounted in the housing, having notches formed in the outer periphery thereof, and having a dog mounted in the housing. Pressure means is provided for biasing the dog toward the wheel, the dog being movable automatically from a first aspect where it does not engage The surfaces of the notches to a second aspect where it does engage a surface of a notch in driving relationship.

More specifically, the wheel is provided with a substantial land between successive pairs of notches and the dog is provided with a broad surface that slides on successive land and is large enough to bridge each notch.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
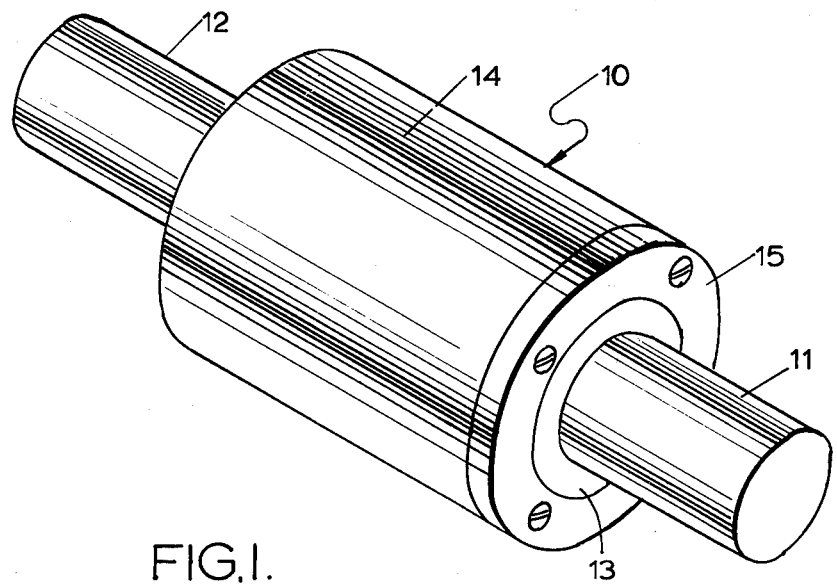
FIG. 1 is a prospective view of a uni-directional mechanism embodying the principles of the present invention.

Referring further to FIG. 1 which best shows the general features of the invention, the uni-directional mechanism indicated generally by the reference numeral 10, is indicated as joining a driving shaft 11 to a driven shaft 12. Attached to the driving shaft 11 is an input element 13, while the driven shaft 12 is connected to an output element 14. The cover 15 is screwed to the face of the output element 14 on the side that faces toward the driving shaft 11. Generally speaking, the output element which is 14 and the cover 5 form a housing which encloses the input element 13. The driving shaft 11 is adapted to be connected to a driving device such as an electric motor. While the driven shaft 12 is adapted to be connected to a driven device, such as a machine tool.

Figure 2:
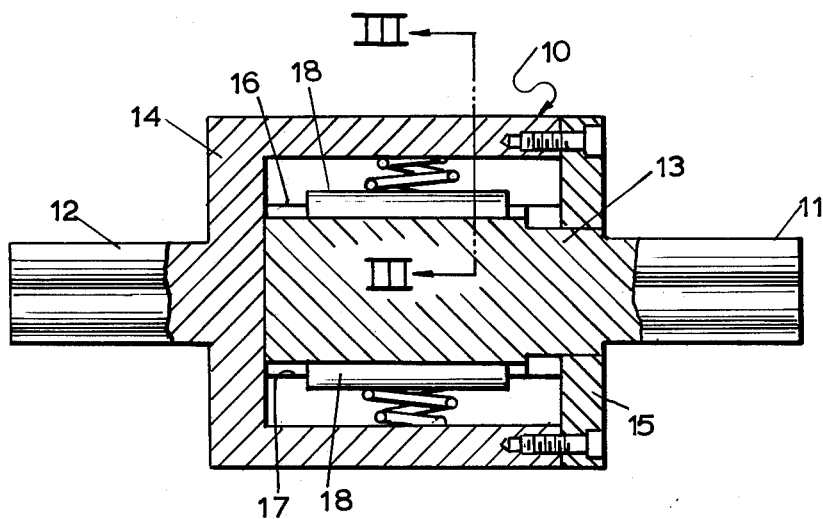
FIG. 2 is a vertical sectional view of the mechanism.

In FIG. 2 it can be seen that the input element is provided with a cylindrical surface 16 which is coaxial with the driving shaft 11. This cylindrical surface lies within a bore 17 which is formed in the output element 14 and which is coaxial with the driven shaft 12. Extending between the input element 13 and the output element 14, in a manner which will be described more fully hereinafter, are a series of dogs 18.

Figure 3:
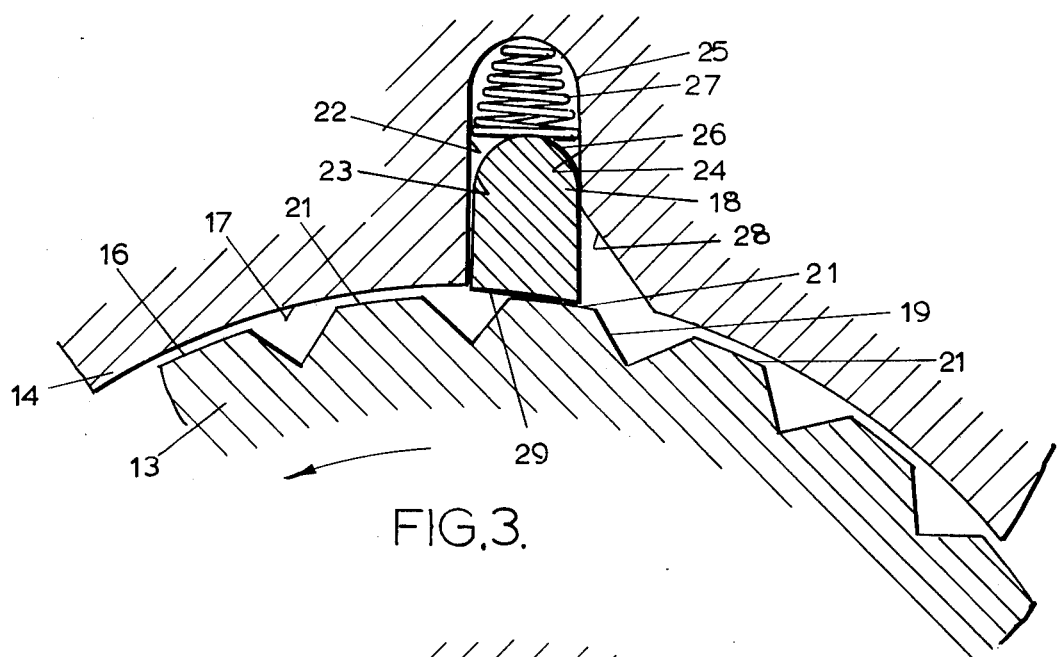
FIG. 3 is a transverse-sectional view of a portion of the mechanism taken on the line III—III of FIG. 2.

Referring now to FIG. 3, which shows the condition of the parts of the uni-directional mechanism when it is non-driving condition, it can be seen that the surface 16 of the input element 13 is interrupted by a series of notches 19, so that the portions of the cylindrical surface 16, which remain between the notches, are formed on interrupted areas or lands 21. Each notch 19 is formed with two plane surfaces which are symmetrical to a radial plane joining the axis of the driving shaft 11 to the vertex of the notch. The surfaces subtending an angle of approximately 90° so that the sides lie at 45° on either side of the radius.

Each of the dogs 18 lies in a recess 22 formed in the output element 14. Each recess is in the nature of a longitudinal groove cut into the surface of the bore 17 of the output element. Generally speaking, each recess 22 is defined by two spaced parallel plane sides 23 and 24 joined at their inner end by a semi-cylindrical surface 25. The adjacent inner end of the dog 18 is provide with a similar semi-circular surface 26. Between the surfaces 25 and 26 lies a conical coil spring 27, which is slightly compressed with its small end resting against the surface 25 and its large end against the the surface 26. Thus, resiliently biasing the dog 18 toward the input element 13. One side of the recess 22, where it opens onto the bore 17 and the output element, is provided with a generous chamfer by an inclined surface 28. This surface lies at an angle of approximately 45° to a radius and is located at the side of the recess toward which the grooves 19 move where the input element 13 is rotating in a clockwise direction (when the mechanism is viewed as FIGS. 3 and 4). The inner end of the dog 18 is provided with a flat surface 29 which lies at a right angle to the sides of the dog.

Figure 4:
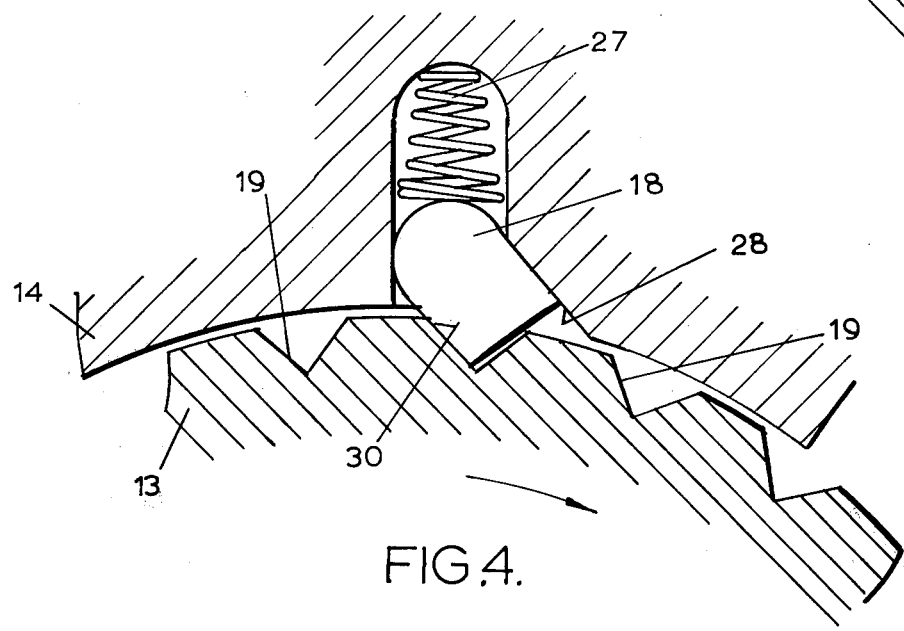
FIG. 4 is a sectional view of the mechanism similar to that shown in FIG. 3, but with the parts in a different relationship.

The operation of the apparatus will now be readily understood in view of the above description. When the input element 13 is rotated in the counter-clockwise direction, the mechanism has the condition shown in FIG. 3. At that time the dog 18 lies in a generally radial position with its side pressed against the side 23 of the recess 22. The end surface 29 of the dog 18 slide smoothly over the lands 21 of the input element 13. The surface 29 extends circumferentially in a great enough distance to bridge each of the notches 19. When, however, as shown in FIG. 4, the input element 13 is rotated in the clockwise direction the friction between the surface 29 and surface of the land 21 drags the dog to the right and causes it to occupy the position shown in the drawing, with the side of the dog 18 pressed against the inclined surface 28 of the recess. In addition close spring 25 presses it radially inwardly so that the corner of the dog falls into a notch 19. The "down stream" side of the notch 19, indicated in FIG. 4 by the reference numeral XXX, drives the dog tightly against the surface 28 which is substantially parallel to it. This means that force is transmitted from the input element 13 to the output element 14. Furthermore, this force is transmitted through an area of the dog 18 which is quite extensive. That is to say, the shear stress on the dog is very small because of the area through which the force is transmitted. The use of the off-center slot causes a tilting of the sprawl element and is the primary reason for engagement.

If the input element 13 is reversed, the opposite side of the notch 19 cams the dog 18 back into the recess to the position shown in FIG. 3 and no power is transmitted between the input element 13 and the output element 14.

It can be seen that the present apparatus is capable of connecting a driving device to a driven device and of transmitting large torques with a minimum of wear on the operating parts. It has the advantages of a ratchet clutch and of a sprag clutch, but with none of their disadvantages. The transmission of power takes place immediately at the start of motion of the driving device. There are no delicate parts which are easily worn or broken.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A uni-directional mechanism, comprising:
   a. a rotatable input element in the form of a wheel with a generally cylindrical periphery,
   b. a rotatable output element in the form of a housing having a cylindrical bore whose surface lies adjacent to the periphery of the wheel,
   c. a dog mounted in the output element, the dog mounted in a generally radial recess in the housing, the inner end of the dog is semi-cylindrical, the recess having two parallel spaced sides between which the dog is slidably mounted, one of the said sides of the recess is joined to the surface of the cylindrical bore by a plane surface which is inclined at a substantial angle to the radial,
   d. notches formed on the input element, each notch consisting of two plane surfaces lying symmetrically to a radius and meeting at an angle of about 90°, the wheel being provided with a substantial land between successive pairs of notches and the dog being provided with a broad surface that slides on successive lands and is large enough to bridge each notch, and
   e. a coil spring for biasing the dog toward the said input element, the coil spring being located in the recess and compressed between the inner end of the recess and the inner end of the dog, the dog being movable automatically from a first aspect where it does not engage a surface of a notch when the input element is rotated in one direction to a second aspect where a portion of said semi-cylindrical inner end of the dog engages one of the spaced sides of the recess and a surface of the dog engages the inclined surface of the recess so that the dog does engage a surface of a notch in driving relationship when the input element is rotated in an opposite direction.

2. A uni-directional mechanism as recited in claim 1, wherein:
   the inner end of the recess is semi-cylindrical, and wherein the spring is generally fousto-conical in shape with the small end engaging the end of the recess and the larger end engaging the inner end of the dog.

3. A uni-directional mechanism as recited in cliam 1, wherein:
   the dog has spaced parallel sides extending perpendicularly to the said broad surface, and wherein, when the dog is in the said second aspect, one of the dog sides engages the inclined surface of the recess and the sides engages the inclined surface of the recess and the other side engages a side of a notch.

4. A uni-directional mechanism as recited in claim 1, wherein:
   the output element is provided with a plurality of dogs evenly spaced about the bore.

* * * * *